US012601460B2

(12) United States Patent
Nykerk

(10) Patent No.: US 12,601,460 B2
(45) Date of Patent: Apr. 14, 2026

(54) INDIRECT LIGHTING SYSTEM AND METHOD OF USE

(71) Applicant: Flex-N-Gate Advanced Product Development, LLC, Windsor (CA)

(72) Inventor: Todd Nykerk, Holland, MI (US)

(73) Assignee: Flex-N-Gate Advanced Product Development, LLC, Windsor (CA)

(*) Notice: Subject to any disclaimer, the term of this patent is extended or adjusted under 35 U.S.C. 154(b) by 0 days.

(21) Appl. No.: 18/909,606

(22) Filed: Oct. 8, 2024

(65) Prior Publication Data

US 2025/0137608 A1 May 1, 2025

Related U.S. Application Data

(60) Provisional application No. 63/593,948, filed on Oct. 27, 2023.

(51) Int. Cl.

| | |
|---|---|
| ***F21S 43/16*** | (2018.01) |
| ***F21S 43/33*** | (2018.01) |
| ***F21V 7/00*** | (2006.01) |
| ***F21V 7/30*** | (2018.01) |

(52) U.S. Cl.

CPC ............... *F21S 43/16* (2018.01); *F21S 43/33* (2018.01); *F21V 7/0008* (2013.01); *F21V 7/30* (2018.02)

(58) Field of Classification Search

CPC ................................... F21S 43/16; F21V 7/30

See application file for complete search history.

(56) References Cited

U.S. PATENT DOCUMENTS

| | | | |
|---|---|---|---|
| 7,193,358 B2 | 3/2007 | Yamada et al. | |
| 9,103,517 B2 | 8/2015 | Nakazato et al. | |
| 10,247,381 B2 | 4/2019 | Tsuda et al. | |
| 10,775,011 B2 | 9/2020 | Kamiya et al. | |
| 12,281,774 B2 * | 4/2025 | Sato | F21S 43/14 |
| 2012/0243203 A1 | 9/2012 | Koike et al. | |
| 2019/0203904 A1 | 7/2019 | Lee et al. | |
| 2019/0211989 A1 * | 7/2019 | Takahashi | F21V 13/14 |

FOREIGN PATENT DOCUMENTS

| | | |
|---|---|---|
| EP | 2801752 A1 | 11/2014 |
| JP | 2009206064 A | 9/2009 |
| WO | 2022102785 | 5/2022 |

OTHER PUBLICATIONS

Extended European Search Report issued Mar. 27, 2025 in corresponding EP Application No. 24208856.5, 51 pages.

* cited by examiner

*Primary Examiner* — Robert J May

(74) *Attorney, Agent, or Firm* — Avek IP, LLC

(57) ABSTRACT

An indirect lighting system includes a light emitting element supported in an environment, the light emitting element to emit light in a first direction and in a first color range; a support having a surface positioned at an angle such that at least a portion of the light as emitted from the light emitting element will impinge into the surface; and a coating formed on the surface, the coating to be excited from the portion of light and further to emit a final beam pattern after excitation from the portion of the light; the final beam pattern is emitted in at least a second color range; and the final beam pattern is visibly emitted away from the indirect lighting system without an image of the light emitting element being visible.

18 Claims, 5 Drawing Sheets

INDIRECT LIGHTING SYSTEM AND METHOD OF USE

CROSS-REFERENCE TO RELATED APPLICATIONS

This application claims the benefit of priority of U.S. Provisional Application No. 63/593,948, filed Oct. 27, 2023, the disclosure of which is herein incorporated by reference in its entirety.

BACKGROUND OF THE INVENTION

1. Field

The disclosed embodiments relate generally to the field of providing light that may be used in the transportation industry. More specifically, the disclosed embodiments relate to a system and method for providing light from an indirect source, as well as a method of manufacturing the associated system.

2. Description of the Related Art

Many types of lighting systems are used in the transportation industry. Examples of uses for these lighting systems include headlights, taillights, turn signals, interior lights, and logo displays, among others. Recently, the use of semiconductor-based light sources such as light emitting diodes (LED) and lasers has become common. One disadvantage of the various lighting systems is that the projected light may include an "image" of the light source rather than a light projection that is consistent in color and uniform in luminosity. Therefore, it would be advantageous to devise lighting systems using indirect configurations to provide projected light that is consistent in color and uniform in luminosity and does not include the "image" of the light source.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the present invention relates to an indirect lighting system, comprising a light emitting element supported in an environment, the light emitting element configured to emit light in a first direction and in a first color range; a support having a surface positioned at an angle configured such that at least a portion of the light as emitted from the light emitting element will impinge into the surface; and a coating formed on the surface, the coating configured to be excited from the portion of light and further configured to emit a final beam pattern after excitation from the portion of the light. The final beam pattern is emitted in at least a second color range; and the final beam pattern is visibly emitted away from the indirect lighting system without an image of the light emitting element being visible.

In other embodiments, the present invention relates to a tail lamp with an indirect lighting system for a vehicle, the tail lamp comprising a light emitting element supported by a substrate, the light emitting element and the substrate mounted within a tail lamp environment of the vehicle, the light emitting element configured to emit a first beam pattern in a first direction and in a first color range, the first beam pattern being substantially non-visible from an exterior of the vehicle; a reflector positioned such that at least a portion of the first beam pattern will impinge into the reflector, wherein a second beam pattern is reflected from a reflector surface; a support having a surface positioned at an angle configured such that at least a portion of the second beam pattern will impinge into the surface; and a coating formed on the surface, the coating configured to be excited from the second beam pattern and further configured to emit a third beam pattern after excitation from the second beam pattern. The third beam pattern is emitted in at least a second color range; and the third beam pattern is visibly emitted away from the indirect lighting system without an image of the light emitting element being visible.

In other embodiments, the present invention relates to a method of using a tail lamp with an indirect lighting system, the method comprising providing the tail lamp, installing the tail lamp within a tail lamp environment of a vehicle, and activating a light emitting element to emit a first beam pattern. The tail lamp having a light emitting element supported by a substrate, the light emitting element configured to emit a first beam pattern in a first direction and in a first color range; a reflector positioned such that at least a portion of the first beam pattern will impinge into the reflector, wherein a second beam pattern is reflected from a reflector surface; a support having a surface positioned at an angle configured such that at least a portion of the second beam pattern will impinge into the surface; and a coating formed on the surface, the coating configured to be excited from the second beam pattern and further configured to emit a third beam pattern after excitation from the second beam pattern. The first beam pattern will impinge into the reflector, resulting in the second beam pattern and the second beam pattern will then impinging into the surface to excite the coating; the third beam pattern is emitted in at least a second color range; and the third beam pattern is visibly emitted away from the indirect lighting system without an image of the light emitting element being visible.

BRIEF DESCRIPTION OF SEVERAL VIEWS OF THE DRAWINGS

Illustrative embodiments are described in detail below with reference to the attached drawing figures, which are incorporated by reference herein and wherein.

DETAILED DESCRIPTION

Figure 1:
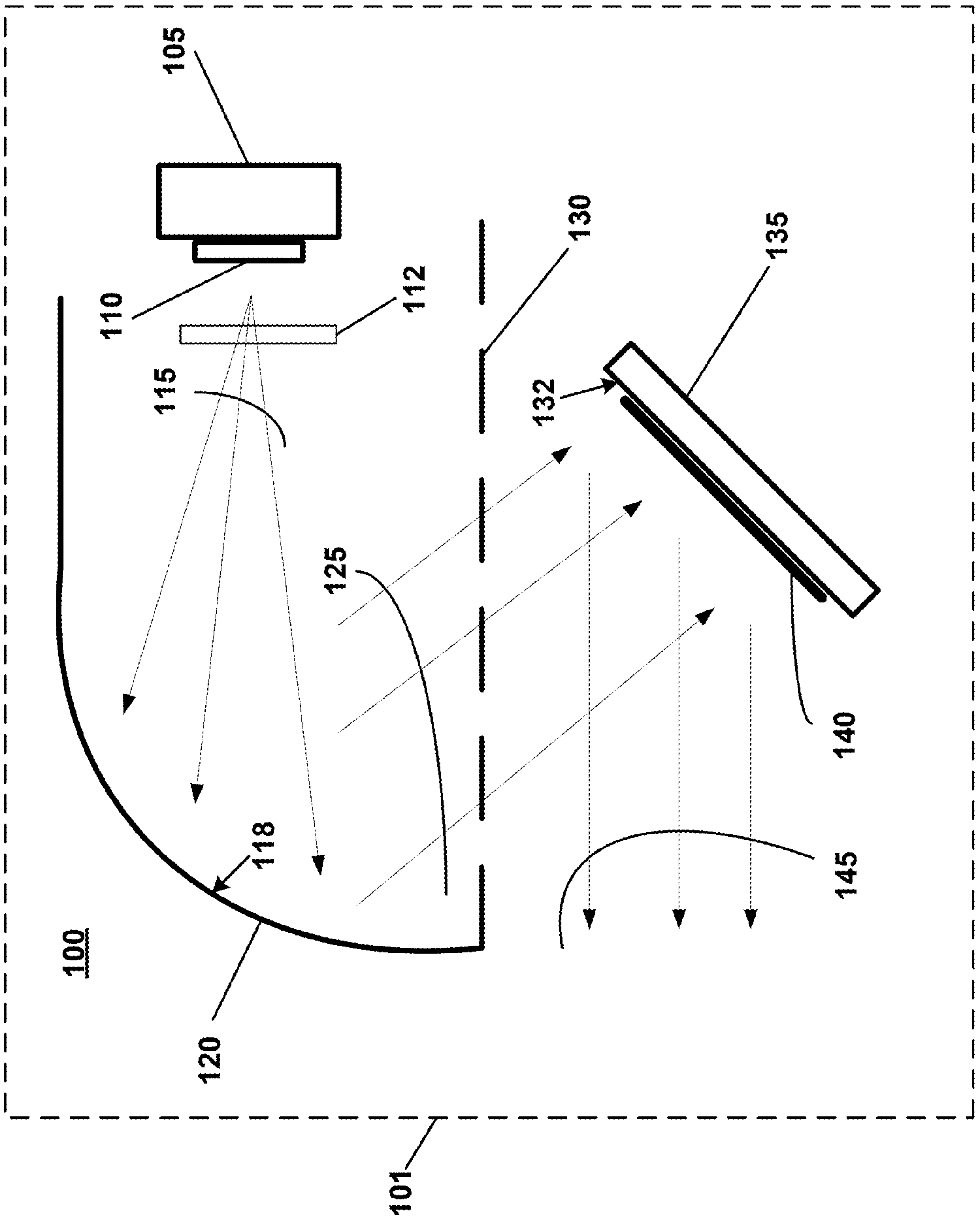
FIG. 1 is a schematic of an indirect lighting system according to a first embodiment of the present application.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

It must be noted that as used herein and, in the claims, the singular forms "a," "an" and "the" include plural referents unless the context clearly dictates otherwise. Thus, for example, reference to "a layer" includes two or more layers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

As used herein, the terms "first," "second," and other ordinals will be understood to provide differentiation only, rather than imposing any specific spatial or temporal order.

As used herein, the term "substantially" generally refers to ±5% of a stated value.

Embodiments disclosed herein provide systems and methods for providing indirect lighting. In some embodiments, the indirect lighting is used in transportation headlights, taillights, logo displays, or informational displays.

FIG. 1 is a schematic of an indirect lighting system 100 within a predetermined environment 101 in accordance with the present invention. In some embodiments, indirect lighting system 100 is configured as part of a tail lamp on a rear portion of a vehicle; however, indirect lighting system 100 may be employed in other vehicle lighting arrangements without departing from the scope hereof. In other words, environment 101 may be an installation location for a tail lamp on a rear portion of a vehicle, which those skilled in the art will understand to vary based on vehicle make, model, etc. Environment 101 is depicted as the dashed outer rectangular line, which is generalized such that those skilled in the art may install the components of the indirect lighting system 100 in any appropriate environment, automotive or otherwise. A light emitting element 110 is supported on a substrate 105. Light emitting element 110 may be any one of a light emitting diode (LED), semiconductor laser, incandescent bulb, compact fluorescent light (CFL), or other light emitting device known in the art. Light emitting substrate 105 may comprise one device or may comprise an array of devices. Light emitting element 110 may emit light in a first color range. Typical first color ranges include infrared (IR), red, orange, yellow, green, blue, indigo, violet, and ultraviolet UV), among others.

Substrate 105 may be any one of a printed circuit board (PCB), hybrid PCB, or other support substrates known in the art. Typically, substrate 105 comprises devices and circuitry to provide power and control signals to light emitting element 110.

Light emitting element 110 emits a first beam pattern 115. A "beam pattern" as used herein is broadly defined as a collection of projected light rays. First beam pattern 115 may first travel through a lens 112 and then impinges upon a reflector surface 118 as part of a reflector 120, and changes direction based on a curvature, shape, and positioning of reflector surface 118. Lens 112 can be mounted within environment 101 through any appropriate means in the art, such as directly to substrate 105 or to a separate support structure and aids in focusing first beam pattern 115 such that it efficiently impinges into surface 118. Reflector 120 and reflector surface 118 may be a polished metal or may comprise a substrate such as glass or plastic that has a reflective metal coating deposited thereon. In some embodiments, reflector 120 has a curved geometry. Examples of curved geometries include concave shapes, convex shapes, toric shapes, and saddle shapes, among others. A concave shape is illustrated in FIG. 1.

Light reflected from surface 118 of reflector 120 forms a second beam pattern 125 that travels at an angle different from the incident angle of first beam pattern 115. Second beam pattern 125 may then pass through a transparent lens 130. Transparent lens 130 may comprise any known clear material such as plastic, glass, polymer film, etc.

Second beam pattern 125 then impinges upon a surface 132 of a support 135. Support 135 comprises a coating 140 formed on surface 132 of the support at least partially facing reflector 120. Support 135 may comprise any known material such as metal, composite, plastic, glass, polymer film, etc. Coating 140 comprises one or more phosphor materials selected to emit a third beam pattern 145 after excitation from second beam pattern 125. The phosphor material of coating 140 is selected to emit light in specific color ranges, which may specifically be different from the first color range emitted by light emitting element 110. Typical color ranges include infrared (IR), red, orange, yellow, green, blue, indigo, violet, white, and ultraviolet UV), among others. Coating 140 may comprise a single phosphor material to emit light in a single color or may comprise more than one phosphor material to emit light in a variety of colors. In embodiments, coating 140 comprises a phosphor powder embedded into a film material.

Coating 140 may be deposited on support 135 using any well-known technique such as spraying, printing, screen printing, dipping/immersion, rolling, added during molding, chemical vapor deposition (CVD), physical vapor deposition (PVD), and atomic layer deposition (ALD), among others.

Coating 140 may be uniformly deposited upon support 135 to emit third beam pattern 145 with a uniform luminescence. Coating 140 may be deposited upon support 135 in a pattern to emit a third beam pattern 145 with a patterned luminescence. Examples of patterned luminescence comprise markings, logos, text, informational graphics, and signal indicators, among others.

The specifically selected phosphor material will comprise any single or combination of materials known for their phosphorescence properties, either known now or discovered and useful for the intended purpose described herein. These materials are those that are configured to absorb energy and reemit the energy after excitation from light emitting element 110.

The combination of reflector 120, transparent lens 130, and specifically coating 140 is operable to obscure the image of light emitting element 110 when viewed by an outside observer. Third beam pattern 145 contains no light rays that lead directly back to light emitting element 110. Coating 140 is excited by the second beam pattern 125 and emits light in a uniform color and uniform luminosity. Proper selection of light emitting element 110 and coating 140 results in third beam pattern 145 being properly configured to meet legal requirements for the transportation industry such as beam size, beam pattern, luminosity, and color, among others. In some embodiments, third beam pattern 145 is the final beam pattern, however, in alternative embodiments, as discussed later herein, a second beam pattern becomes the final beam pattern.

Light emitting element 110 may emit light in a continuous manner to subsequently produce third beam pattern 145 with continuous luminescence. Light emitting element 110 may emit light in a pulsed manner to subsequently produce third beam pattern 145 with pulsed luminescence. Light emitting element 110 may emit light in a raster manner (e.g., left-right and/or up-down) to subsequently produce a third beam pattern 145 with raster luminescence. Light emitting element 110 may emit light with a variation in intensity (e.g., a dimmable light source) to subsequently produce a third beam pattern that correspondingly varies in intensity over time. The pulsing and/or raster operation of light emitting element 110 may be used to convey additional information using lighting system 100.

In at least some embodiments, indirect lighting system 100 is specifically incorporated into a rear tail lamp of an automobile, as would be understood by those skilled in the art. In one exemplary embodiment, wherein environment 101 is a rear tail lamp, light emitting element 110 is a blue LED, emitting first beam pattern 115 in a blue color range, wherein coating 140 is configured for emission of red light when excited, as would be appropriate for a tail lamp in the automotive industry.

Figure 2:
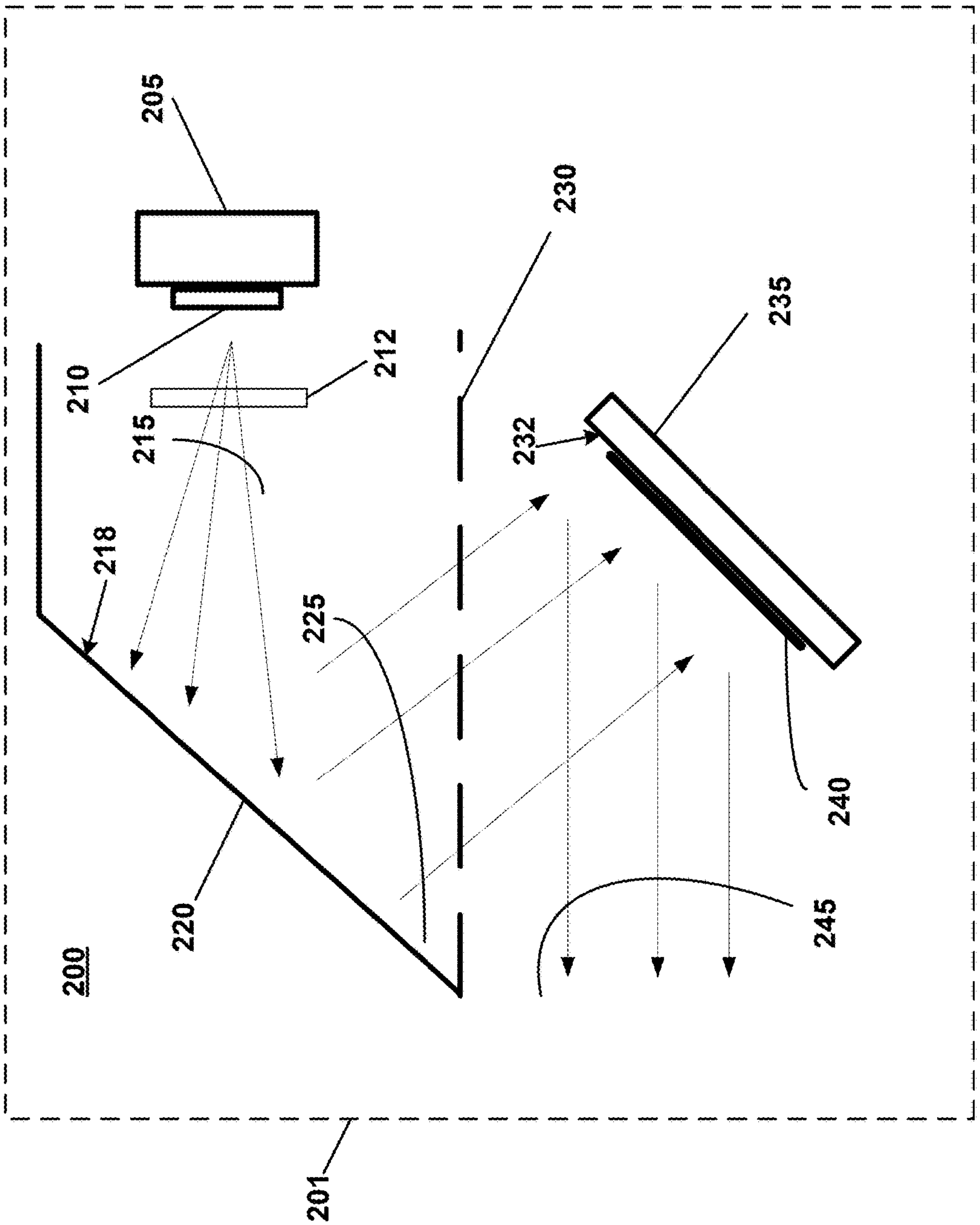
FIG. 2 is a schematic of an indirect lighting system according to a second embodiment of the present application.

FIG. 2 is a schematic of a second embodiment an indirect lighting system 200 within a predetermined environment 201. Again, predetermined environment 201 can be any environment appropriate for a lighting system, such as a tail lamp or other automotive environment. A light emitting element 210 is supported on a substrate 205. Light emitting element 210 may be any one of a light emitting diode (LED), semiconductor laser, incandescent bulb, compact fluorescent light (CFL), or other light emitting device known in the art. Light emitting substrate 205 may comprise one device or may comprise an array of devices. Light emitting element 210 may emit light in a first color range. Typical first color ranges include infrared (IR), red, orange, yellow, green, blue, indigo, violet, and ultraviolet UV), among others.

Substrate 205 may be any one of a printed circuit board (PCB), hybrid PCB, or other support substrates known in the art. Typically, substrate 205 comprises devices and circuitry to provide power and control signals to light emitting element 210.

Light emitting element 210 emits a first beam pattern 215 which may first travel through a lens 212, which is configured to aid in focusing first beam pattern 215. First beam pattern 215 then impinges upon a reflector surface 218 of a reflector 220 and changes direction. Reflector 220 and associated surface 218 may be a polished metal or may comprise a substrate such as glass or plastic that has a reflective metal coating deposited thereon. In some embodiment, reflector 220 and reflector surface 218 have a planar geometry.

Light reflected from surface 218 of reflector 220 forms a second beam pattern 225 that travels at an angle different from the incident angle of the first beam pattern 215. Second beam pattern 225 may then pass through a transparent lens 230. Transparent lens 230 may comprise any known clear material such as plastic, glass, polymer film, etc.

Second beam pattern 225 then impinges upon a surface 232 of a support 235. Support 235 comprises a coating 240 formed on surface 232 of the support facing the reflector 220. Support 235 may comprise any known material such as metal, composite, plastic, glass, polymer film, etc. Coating 240 comprises a phosphor material selected to emit a third beam pattern 245 after excitation from second beam pattern 225. The phosphor material of coating 240 is selected to emit light in specific color ranges, which may specifically be different from the first color range. Typical color ranges include infrared (IR), red, orange, yellow, green, blue, indigo, violet, white, and ultraviolet UV), among others. Coating 240 may comprise a single phosphor material to emit light in a single color or may comprise more than one phosphor material to emit light in a variety of colors.

Coating 240 may be deposited on support 235 using any well-known technique such as spraying, printing, screen printing, dipping/immersion, rolling, added during molding, chemical vapor deposition (CVD), physical vapor deposition (PVD), and atomic layer deposition (ALD), among others.

Coating 240 may be uniformly deposited upon support 235 to emit a third beam pattern 245 with a uniform luminescence. Coating 240 may be deposited upon support 235 in a pattern to emit a third beam pattern 245 with a patterned luminescence. Examples of patterned luminescence comprise markings, logos, text, informational graphics, and signal indicators, among others.

The combination of reflector 220, transparent lens 230, and specifically coating 240 is operable to obscure the image of light emitting element 210 when viewed by an outside observer. Third beam pattern 245 contains no light rays that lead directly back to light emitting element 210. Coating 240 is excited/energized by the second beam pattern 225 and emits light in a uniform color and uniform luminosity. Proper selection of light emitting element 210 and coating 240 results in third beam pattern 245 being properly configured to meet legal requirements for the transportation industry such as beam size, beam pattern, luminosity, and color, among others.

Light emitting element 210 may emit light in a continuous manner to subsequently produce a third beam pattern 245 with continuous luminescence. Light emitting element 210 may emit light in a pulsed manner to subsequently produce a third beam pattern 245 with pulsed luminescence. Light emitting element 210 may emit light in a raster manner (e.g., left-right and/or up-down) to subsequently produce a third beam pattern 245 with raster luminescence. Light emitting element 210 may emit light with a variation in intensity to subsequently produce a third beam pattern that varies in intensity over time. The pulsing and/or raster operation of light emitting element 210 may be used to convey additional information using lighting system 200.

As discussed above, in some specific embodiments, indirect lighting system 200 within predetermined environment 201 is a tail lamp as part of an automobile, wherein light emitting element 210 emits first beam pattern 215 in a blue color range, and wherein coating 240 is specifically configured to emit third beam pattern 245 in a red color range once excited.

Lighting system 100 in FIG. 1 and lighting system 200 in FIG. 2 may each comprise other optical elements that are well known in the art. Examples of optical elements comprise lenses, diffusers, lenticular sheets, double-sided optical sheets and additional reflectors, among others. Exemplary lenticular sheets are described in U.S. Pat. No. 10,578,272 to Nykerk et al.; exemplary double-sided optical sheets are described in U.S. Pat. No. 11,624,492 to Nykerk; and, exemplary reflector lamps are described in U.S. Pat. No. 10,627,067 to Nykerk et al. The disclosures of these three patents are hereby incorporated by reference in their entirety. These optical elements and others may be placed such that they interact with at least one of the first beam pattern, second beam pattern, and third beam pattern.

Figure 3:
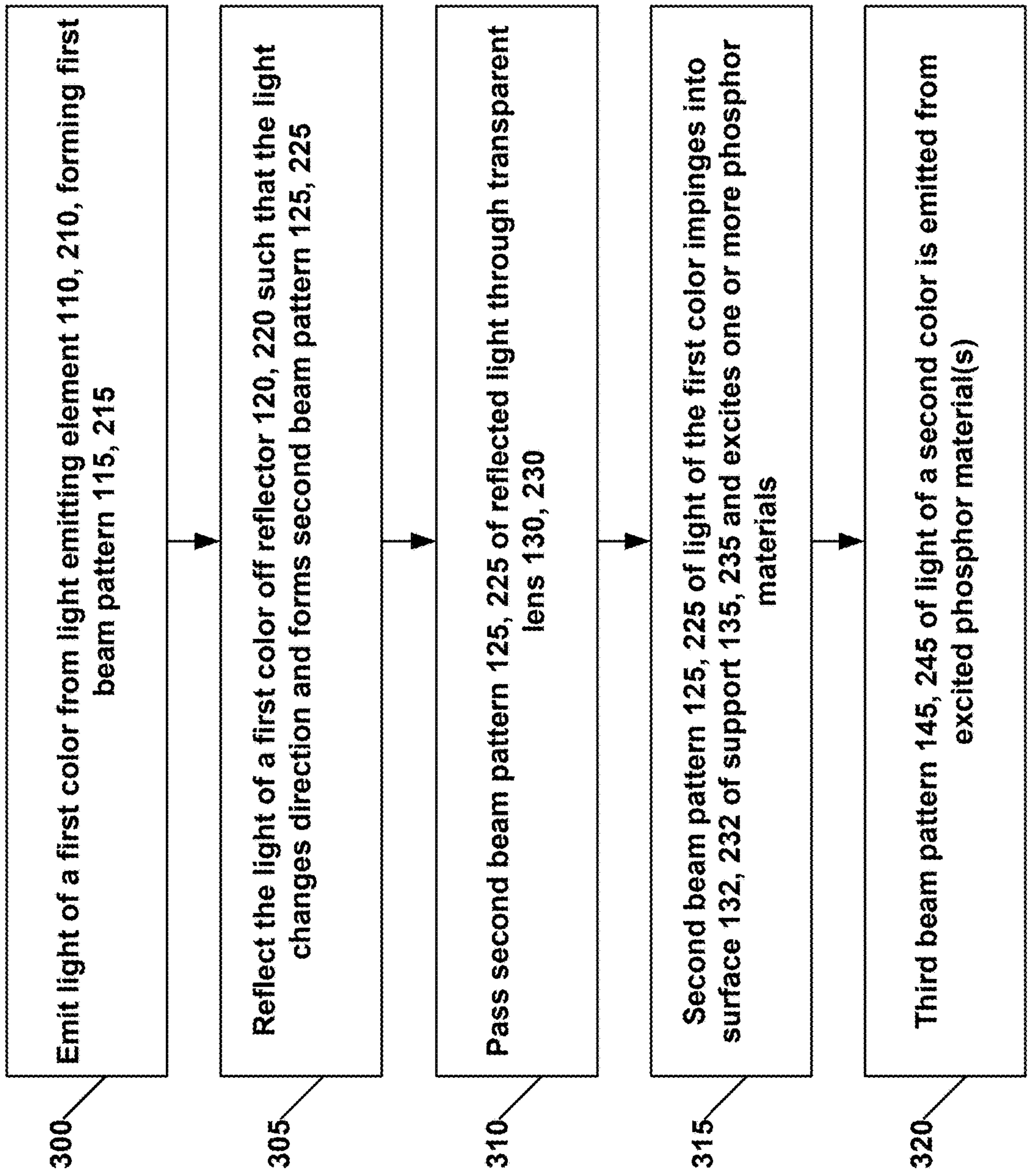
FIG. 3 illustrates methods used to provide light utilizing the systems of FIGS. 1 and 2.

FIG. 3 illustrates methods used to provide indirect lighting. At step 300, light of a first color is emitted from light emitting element 110, 210 to form first beam pattern 115, 215. As discussed previously, the light may be emitted from a light emitting element such as any one of a light emitting diode (LED), semiconductor laser, incandescent bulb, compact fluorescent light (CFL), or other light emitting device known in the art. At step 305, the light of a first color, in the first beam pattern 115, 215, is reflected via reflector 120, 220 and changes direction to form second beam pattern 125, 225. As discussed previously, the reflector may have a curved geometry or may have a planar geometry. Furthermore, the reflector may be a polished metal or may comprise a substrate such as glass or plastic that has a reflective metal coating deposited thereon. At step 310, second beam pattern 125, 225 of reflected light of a first color is passed through transparent lens 130, 230. The transparent lens may comprise any known clear material such as plastic, glass, polymer film, etc. At step 315, second beam pattern 125, 225 of reflected light of a first color is operable to excite phosphor coating 140, 240 presented on surface 132, 232 of support 135, 235 after passing through transparent lens 130, 230. At step 320, the excited phosphor coating 140, 240 emits third beam pattern 145, 245 of light of a second color. In some embodiments, the first color and the second color are specifically different.

Figure 4:
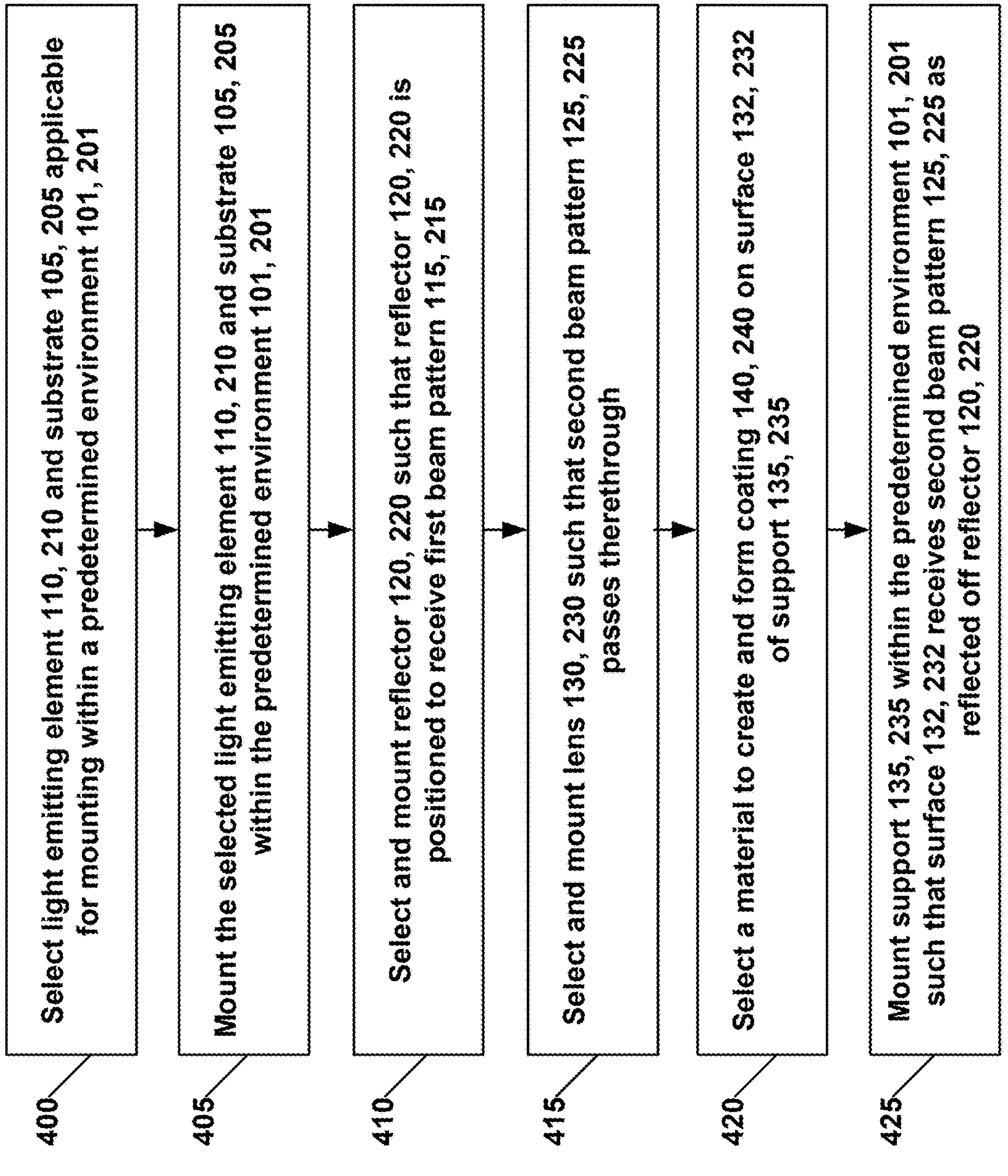
FIG. 4 illustrates a method of manufacturing the indirect lighting systems of FIGS. 1 and 2 according to some embodiments.

FIG. 4 illustrates a simplified method of manufacturing indirect lighting systems 100, 200 according to embodiments of the present application. At step 400, light emitting element 110, 210 and substrate 105, 205 are selected for use in a predetermined environment 101, 201. For example, in embodiments applicable for the automotive industry, light emitting element 110, 210 and substrate 105, 205 are selected for mounting within a tail lamp or other applicable environment, having all the necessary equipment and devices known to those skilled in the art. At step 405, light emitting element 110, 210 and substrate 105, 205 are accordingly mounted. At steps 410 and 415, reflector 120, 220 and lens 130, 230 are also selected and incorporated into environment 101, 201, again based on a desired use of the system. At step 420, one or more phosphor materials are selected and used to form coating 140, 240 on surface 132, 232 of support 135, 235. The phosphor material(s) is/are selected based on desired qualities of third beam pattern 145, 245, such as color and/or pattern. Specifically, in a tail lamp embodiment, the phosphor material(s) are selected to output a red color range. At step 425, support 135, 235 is mounted within environment 101, 201 to receive impingement of second beam pattern 125, 225 such that coating 140, 240 is excited and outputs third beam pattern 145, 245. As discussed above, the system is configured such that third beam pattern 145, 245 is visible, while an image of light emitting element 110, 210 is not visible. In embodiments specific to tail lamps, third beam pattern 145, 245 is visible from a rear exterior of a vehicle, while light emitting element 110, 210 is not visible.

Figure 5:
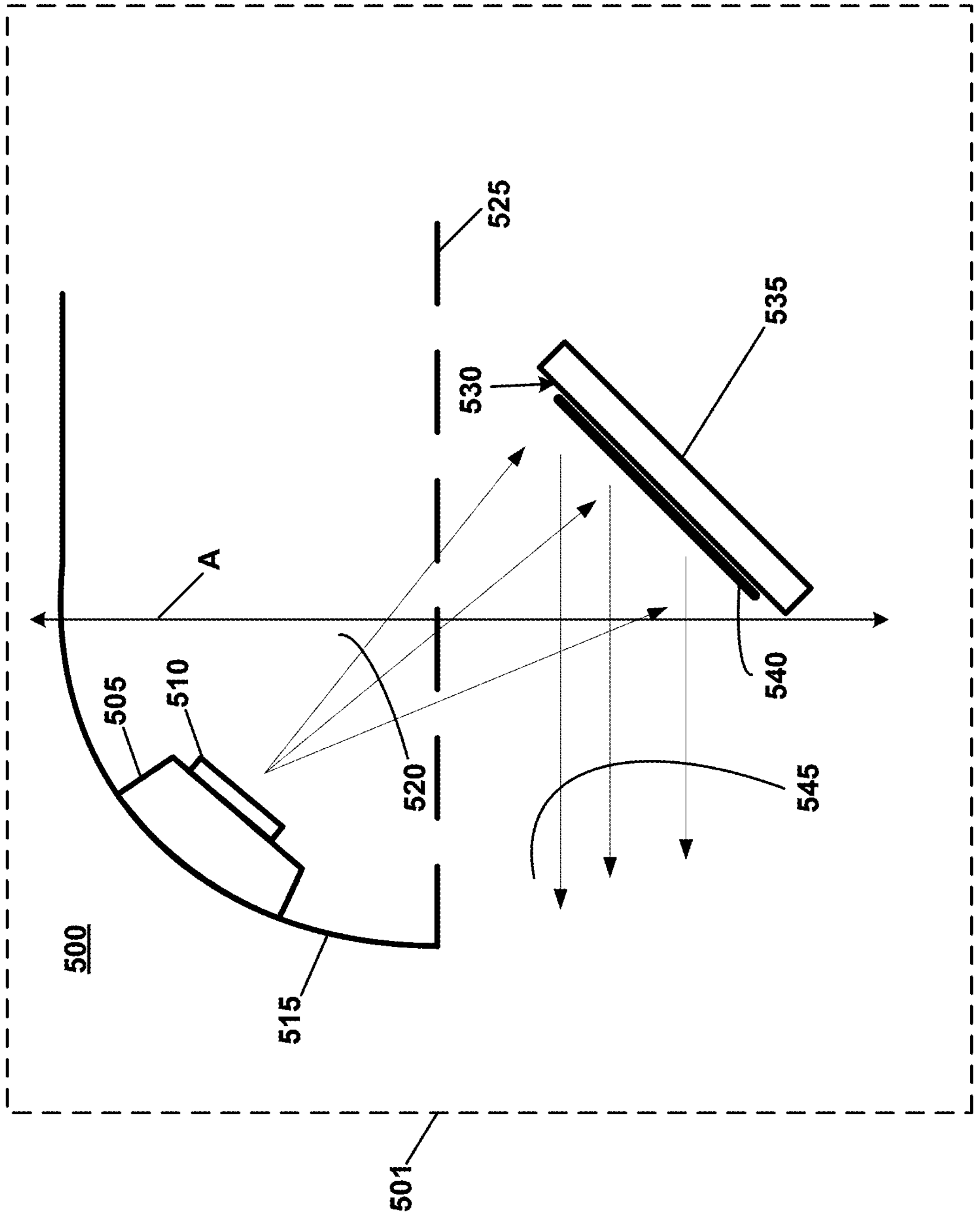
FIG. 5 is a schematic of an indirect lighting system according to a third embodiment of the present application The drawing figures do not limit the invention to the specific embodiments disclosed and described herein. The drawings are not necessarily to scale, emphasis instead being placed upon clearly illustrating the principles of the invention.

FIG. 5 is a schematic of a third embodiment an indirect lighting system 500 within a predetermined environment 501. Again, predetermined environment 501 can be any environment appropriate for a lighting system, such as a tail lamp or other automotive environment. In this embodiment, a light emitting element 510 is supported on a substrate 505. Light emitting element 510 may be any one of a light emitting diode (LED), semiconductor laser, incandescent bulb, compact fluorescent light (CFL), or other light emitting device known in the art. Light emitting substrate 505 may comprise one device or may comprise an array of devices. Light emitting element 510 may emit light in a first color range. Typical first color ranges include infrared (IR), red, orange, yellow, green, blue, indigo, violet, and ultraviolet UV), among others.

Substrate 505 may be any one of a printed circuit board (PCB), hybrid PCB, or other support substrates known in the art. Typically, substrate 505 comprises devices and circuitry to provide power and control signals to light emitting element 510.

In this embodiment, light emitting element 510 and/or substrate 505 are mounted to a support structure 515, which may be any appropriate structure depending on environment 501. Light emitting element 510 emits a first beam pattern 520 which will travel through a transparent lens 525 to directly impinge upon a surface 530. In the embodiment shown in FIG. 5, light emitting element 510 is positioned in the environment 501 at a position in front of surface 530. In other words, surface 530 is positioned wholly behind plane A, while light emitting element is positioned wholly in front of plane A, thereby directing first beam pattern 520 in a substantially angled and rearward direction as shown. Transparent lens 525 may comprise any known clear material such as plastic, glass, polymer film, etc.

Beam pattern 520 then directly impinges surface 530 of a support 535. Support 535 comprises a coating 540 formed on surface 530 of the support facing the light emitting element 510. Support 535 may comprise any known material such as metal, composite, plastic, glass, polymer film, etc. Coating 540 comprises a phosphor material selected to emit a second beam pattern 545 after excitation from first beam pattern 520. The phosphor material of coating 540 is selected to emit light in specific color ranges, which may specifically be different from the first color range. Typical color ranges include infrared (IR), red, orange, yellow, green, blue, indigo, violet, white, and ultraviolet UV), among others. Coating 540 may comprise a single phosphor material to emit light in a single color or may comprise more than one phosphor material to emit light in a variety of colors.

Coating 540 may be deposited on support 535 using any well-known technique such as spraying, printing, screen printing, dipping/immersion, rolling, added during molding, chemical vapor deposition (CVD), physical vapor deposition (PVD), and atomic layer deposition (ALD), among others.

Coating 540 may be uniformly deposited upon support 535 to emit a second beam pattern 545 with a uniform luminescence. Coating 540 may be deposited upon support 535 in a pattern to emit a second beam pattern 245 with a patterned luminescence. Examples of patterned luminescence comprise markings, logos, text, informational graphics, and signal indicators, among others.

The configuration and location of light emitting element 510 in combination with transparent lens 525, and specifically coating 540 is operable to obscure the image of light emitting element 510 when viewed by an outside observer. Second beam pattern 545 contains no light rays that lead directly back to light emitting element 510. Coating 540 is excited/energized by the first beam pattern 520 and emits light in a uniform color and uniform luminosity. Proper selection of light emitting element 510 and coating 540 results in second beam pattern 545 being properly configured to meet legal requirements for the transportation industry such as beam size, beam pattern, luminosity, and color, among others. In this embodiment, second beam pattern 545 is the final beam pattern.

Light emitting element 510 may emit light in a continuous manner to subsequently produce a second beam pattern 545 with continuous luminescence. Light emitting element 510 may emit light in a pulsed manner to subsequently produce a second beam pattern 545 with pulsed luminescence. Light emitting element 510 may emit light in a raster manner (e.g., left-right and/or up-down) to subsequently produce a second beam pattern 545 with raster luminescence. Light emitting element 510 may emit light with a variation in intensity to subsequently produce a third beam pattern that varies in intensity over time. The pulsing and/or raster operation of light emitting element 510 may be used to convey additional information using lighting system 500.

As discussed above, in some specific embodiments, indirect lighting system 500 within predetermined environment 501 is a tail lamp as part of an automobile, wherein light emitting element 510 emits first beam pattern 520 in a blue color range, and wherein coating 540 is specifically configured to emit second beam pattern 545 in a red color range once excited.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need to be carried out in the specific order described.

What is claimed is:

1. An indirect lighting system, comprising:

a light emitting element supported in an environment, the light emitting element configured to emit light in a first direction and in a first color range;

a support having a surface positioned at an angle configured such that at least a portion of the light as emitted from the light emitting element will impinge into the surface; and a coating formed on the surface, the coating configured to be excited from the portion of light and further configured to emit a final beam pattern after excitation from the portion of the light;

wherein the final beam pattern is emitted in at least a second color range;

wherein the final beam pattern is visibly emitted away from the indirect lighting system without an image of the light emitting element being visible due to the final beam pattern containing no light rays that lead directly back to the light emitting element;

wherein the environment is defined as having a front portion and a rear portion, the front portion and the rear portion being separated by a first plane and the front portion being defined as having a front end through which the final beam pattern travels as the final beam pattern is visibly emitted away from the indirect lighting system;

wherein the light emitting element is positioned within the environment within the front portion and wholly in front of the first plane and the surface is positioned within the environment within the rear portion and wholly behind the first plane; and wherein the portion of the light emitted from the light emitting element is emitted in a substantially rearward direction and travels through the first plane before directly impinging impinges into the surface to excite the coating and the final beam pattern is emitted in a substantially front direction and travels through the first plane before traveling out of the environment through the front end and wherein the coating further comprises a first phosphor material and a second phosphor material, the first phosphor material is configured to emit a first color when excited and the second phosphor material is configured to emit a second color when excited, the first color and the second color being different.

2. The system of claim 1, wherein the first color range and the second color range are different.

3. The system of claim 1, wherein the first color range is a blue color range and wherein the second color range is a red color range, the red color range being determined based on a selected material for the coating.

4. The system of claim 1, wherein the coating is formed from a phosphor material, the phosphor material selected to create the final beam pattern in the second color range when excited.

5. The system of claim 1, further comprising a lens positioned such that the portion of light travels through the lens before impinging on the surface.

6. The system of claim 1, wherein the indirect lighting system is configured for use within a tail lamp environment of a vehicle.

7. A tail lamp with an indirect lighting system for a vehicle, the tail lamp comprising:

a light emitting element supported by a substrate, the light emitting element and the substrate mounted within a tail lamp environment of the vehicle, the light emitting element configured to emit a first beam pattern in a first direction and in a first color range, the first beam pattern being substantially non-visible from an exterior of the vehicle;

a reflector positioned such that at least a portion of the first beam pattern will impinge into the reflector, wherein a second beam pattern is reflected from a reflector surface;

a lens positioned in front of the light emitting element such that the lens is configured to focus the first beam pattern before said first beam pattern impinges into the reflector surface;

a support having a surface positioned at an angle configured such that at least a portion of the second beam pattern will impinge into the surface; and a coating formed on the surface, the coating formed by a first phosphor material and a second phosphor material, the first and second phosphor materials each configured to be excited from the second beam pattern and further configured to emit a third beam pattern after excitation from the second beam pattern, the third beam pattern being emitted in at least two separate colors due to the first phosphor material and the second phosphor material;

wherein the third beam pattern is visibly emitted away from the indirect lighting system without an image of the light emitting element being visible.

8. The tail lamp of claim 7, wherein the light emitting element is a blue light emitting diode configured to emit a blue color range and the first phosphor material is configured to emit a red color range when excited.

9. The tail lamp of claim 7, further comprising:

a second lens positioned such that the second beam pattern travels through the second lens before impinging on the surface.

10. The tail lamp of claim 7, wherein the reflector has a curved geometry such that the reflector surface is curved at a location where the first beam pattern impinges.

11. The tail lamp of claim 7, wherein the reflector has a planar geometry such that the reflector surface is flat at a location where the first beam pattern impinges.

12. The system of claim 7, wherein the first phosphor material and the second phosphor material are arranged on the surface in a pattern such that the third beam pattern is emitted in the pattern.

13. The system of claim 12, wherein the pattern is selected from a group consisting of a logo; a textual depiction; and a signal indicator.

14. An indirect lighting method for a vehicle tail lamp, the method comprising:

emitting a first beam pattern in a first direction and in a first color range via a light emitting element supported by a substrate, the first beam pattern traveling through a first lens positioned in front of the light emitting element, the first lens configured to focus the first beam pattern;

reflecting the first beam pattern off a reflector surface to form a second beam pattern, wherein the reflector surface is positioned such that at least a portion of the first beam pattern impinges the reflector surface after the first beam pattern travels through the first lens;

exciting a coating on a support surface via the second beam pattern, wherein the coating is formed by a first phosphor material and a second phosphor material on the support surface, the support surface positioned at an angle configured such that at least a portion of the second beam pattern will impinge into the surface; and emitting a third beam pattern in at least two separate colors from the vehicle tail lamp after excitation from the second beam pattern, the at least two separate colors determined by the first phosphor material and the second phosphor material;

wherein the third beam pattern is visibly emitted away from the vehicle tail lamp without an image of the light emitting element being visible.

15. The method of claim 14, wherein the light emitting element is a blue light emitting diode configured to emit a blue color range and the first phosphor material is configured to emit a red color range when excited.

16. The method of claim 14, further comprising emitting the second beam pattern through a second lens positioned such that the second beam pattern travels through the second lens before impinging on the support surface.

17. The method of claim 14, wherein the first phosphor material and the second phosphor material are arranged on the surface in a pattern such that the third beam pattern is emitted in the pattern.

18. The method of claim 17, wherein the pattern is selected from a group consisting of a logo; a textual depiction; and a signal indicator.

* * * * *